United States Patent
Munoz et al.

(10) Patent No.: US 6,796,527 B1
(45) Date of Patent: Sep. 28, 2004

(54) INTEGRATED AIR TURBINE DRIVEN SYSTEM FOR PROVIDING AIRCRAFT ENVIRONMENTAL CONTROL

(75) Inventors: Jules Ricardo Munoz, Vernon, CT (US); Luca Bertuccioli, Enfield, CT (US); Michael K. Sahm, Avon, CT (US); Jay Fletcher, Marlborough, CT (US); Charles E. Lents, Amston, CT (US); Steve Squier, Rockford, IL (US); Richard Welch, Rockford, IL (US); Arthur Curtis Becker, Andover, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 10/251,720

(22) Filed: Sep. 20, 2002

Related U.S. Application Data

(60) Provisional application No. 60/323,972, filed on Sep. 20, 2001.

(51) Int. Cl.[7] .............................................. B64D 11/00
(52) U.S. Cl. ..................... 244/118.5; 244/58; 454/74; 454/76; 60/39.142
(58) Field of Search ................................ 244/118.5, 58, 244/53 R; 454/69–76, 115, 141; 60/39.142, 39.141, 39.07

(56) References Cited

U.S. PATENT DOCUMENTS

| | | | | |
|---|---|---|---|---|
| 4,482,114 A | * | 11/1984 | Gupta et al. ............... | 244/118.5 |
| 4,503,666 A | * | 3/1985 | Christoff ..................... | 60/39.07 |
| 5,143,329 A | * | 9/1992 | Coffingerry ............... | 244/118.5 |
| 5,442,905 A | * | 8/1995 | Claeys et al. ............... | 60/39.07 |
| 5,813,630 A | * | 9/1998 | Williams .................. | 244/118.5 |
| 5,911,388 A | * | 6/1999 | Severson et al. ......... | 244/118.5 |
| 5,967,461 A | * | 10/1999 | Farringtion ............... | 244/118.5 |
| 6,050,080 A | * | 4/2000 | Horner ....................... | 60/39.07 |
| 6,182,435 B1 | * | 2/2001 | Niggemann et al. ........ | 60/39.07 |
| 6,305,156 B1 | * | 10/2001 | Lui .............................. | 60/39.07 |
| 6,415,595 B1 | * | 7/2002 | Wilmot, Jr. et al. ........ | 60/39.07 |

* cited by examiner

*Primary Examiner*—Galen Barefoot
(74) *Attorney, Agent, or Firm*—Bachman & LaPointe, P.C.

(57) ABSTRACT

The present invention relates to an integrated air turbine driving system for providing aircraft environmental control. The system has at least one air driven turbine for providing power to an aircraft mounted accessory drive and for providing heated air to an aircraft anti-ice system. The system further has a subsystem for supplying cooled pressurized air to a flight deck and/or cabin and to aircraft avionics. Still further, the subsystem provides cooling air to other aircraft components such as a generator and/or an aircraft mounted accessory drive.

29 Claims, 2 Drawing Sheets

US 6,796,527 B1

INTEGRATED AIR TURBINE DRIVEN SYSTEM FOR PROVIDING AIRCRAFT ENVIRONMENTAL CONTROL

CROSS-REFERENCE TO RELATED APPLICATION(S)

This application claims the benefit of U.S. Provisional Patent Application 60/323,972, entitled INTEGRATED AIR TURBINE DRIVEN SYSTEM FOR PROVIDING AIRCRAFT ENVIRONMENTAL CONTROL, filed Sep. 20, 2001.

BACKGROUND OF THE INVENTION

The present invention relates to an integrated air turbine driven system for providing environmental control and power to onboard aircraft systems.

Current aircraft power systems are comprised of several major components such as the engine, the environmental control system, and the thermal management system. Typically, these subsystems are designed relatively independently of one another with power being transferred from one subsystem to another in certain predefined ways.

All manned aircraft have an environmental control system to supply cool pressurized air to the cabin and/or flight deck. This is typically accomplished by the use of an air cycle machine. FIG. 1 illustrates a typical environmental control system 10 for an aircraft. Depending upon the mission point, bleed air from the engine 12 is removed from either the mid- or high-pressure stages of the high compressor 14. The bleed air is first cooled by ram air in a primary heat exchanger. The bleed air is then further compressed in the compressor section 16 of the air cycle machine. Additional cooling of the bleed air is performed in a secondary heat exchanger 18 again using ram air as the coolant. The bleed air is then expanded to the desired pressure across the turbine section 20 of the air cycle machine. The expansion process produces the necessary work required to drive the compressor 16 via a shaft 22 and significantly drops the temperature of the bleed air. The cooled bleed air exiting the turbine section 20 is mixed with cabin recirculation air to maintain the temperature of the air entering the cabin at a given level.

One of the deficiencies of this type of system is the penalties which it creates with respect to engine losses. The bleed air used for this system alone could be as much as 5% of the core flow from the engine. Other deficiencies include the weight which is added as a result of having to provide one or more heat exchangers. Still further, the system does not address the issue of providing power to or thermally managing other aircraft components.

SUMMARY OF THE INVENTION

Accordingly, it is an object of the present invention to provide an integrated air turbine driven environmental control system for an aircraft.

It is a further object of the present invention to provide a system as above which provides cooling to aircraft components other than the cabin and/or flight deck.

It is still another object of the present invention to provide a system as above which provides power to aircraft components.

The foregoing objects are attained by the integrated air turbine driven system for providing aircraft environmental control of the present invention.

In accordance with the present invention, an integrated air turbine driven system for providing aircraft environmental control is provided. The system broadly comprises means for using bleed air from a propulsion engine to supply power to an aircraft accessory mounted drive and heated air to an aircraft anti-ice system. The system further comprises means for supplying cooled pressurized air to a cabin and/or flight deck.

Further, in accordance with the present invention, a method for providing environmental control to an aircraft is provided. The method broadly comprises the steps of bleeding air from an aircraft engine, delivering the bleed air to at least one turbine, using the at least one turbine to provide power to an aircraft mounted accessory drive, and delivering air from the at least one turbine to an anti-icing system.

Other details of the integrated air turbine driven system for providing aircraft environmental control, as well as other objects and advantages attendant thereto are set forth in the following detailed description and the accompanying drawings wherein like reference numerals depict like elements.

DETAILED DESCRIPTION OF THE PREFERRED EMBODIMENT(S)

Figure 1:
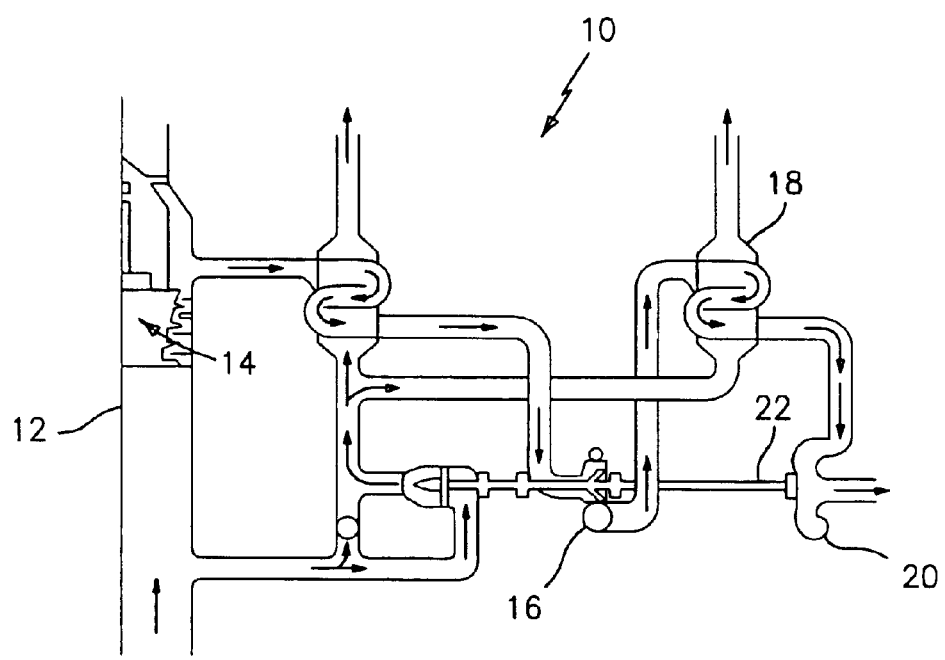
FIG. 1 is a schematic representation of a prior art environmental control system for an aircraft.
Figure 2:
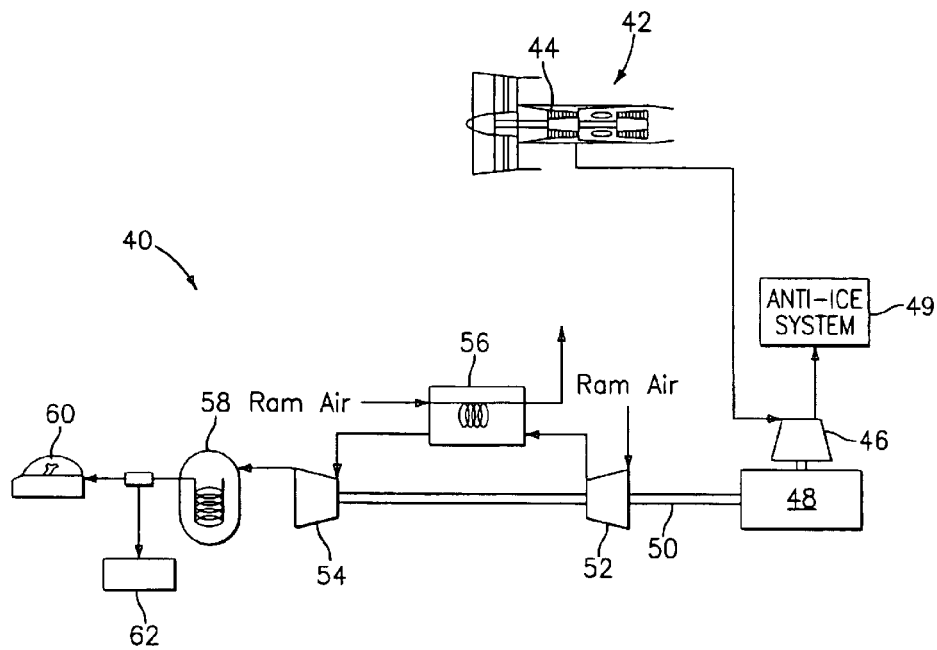
FIG. 2 is a schematic representation of a first embodiment of an integrated air turbine driven system for providing aircraft environmental control in accordance with the present invention.

Referring now to FIG. 2, a first embodiment of an integrated air turbine driven system 40 for providing aircraft environmental control is illustrated. The system 40 uses bleed air from a propulsion engine 42 onboard the aircraft. The bleed air is preferably taken from the high-pressure stage of an engine compressor 44 so that the bleed air is characterized by high pressure, high temperature, and high enthalpy.

The engine bleed air is supplied to the inlet side of an air driven turbine 46 which is preferably positioned close to the engine 42. Since the bleed air comes from the high pressure stage of the compressor 44, a smaller sized turbine can be used for the turbine 46. The air turbine 46 is connected to an aircraft mounted accessory drive 48 which may be used to drive one or more generators (not shown), one or more pumps (not shown), one or more onboard lubrication systems (not shown), and one or more other accessories, and which is used to drive a shaft 50. The engine bleed air drives the turbine 46 which in turn provides shaft power to the drive 48. The engine bleed air exiting the turbine 46 may be supplied to an anti-icing system 49 for preventing icing of the wings.

As can be seen from FIG. 2, an air compressor 52 and an air turbine 54 are mounted on the shaft 50. Ram air is supplied to the air compressor 52 where it is compressed to the necessary pressure for the aircraft's environmental control system and where its temperature is elevated. After leaving the compressor 52, the compressed ram air is passed through a precooler 56. In the precooler 56, ram air is also used as a heat sink for removing heat from the compressed ram air and thereby lowering the temperature of the compressed ram air. The ram air which has been used as a heat sink and had its temperature elevated may be used as a source of cooling and/or ventilation for aircraft components such as one or more generators and/or other aircraft enclosures (not shown).

After exiting the precooler 56, the compressed ram air is passed through the air turbine 54 where it is expanded and its temperature is lowered. The compressed ram air is then passed through a water separator 58 where moisture in the compressed ram air is separated out. Thereafter, the compressed ram air may be supplied to the cabin and/or flight deck 60 for providing environmental control. In a preferred embodiment of the system 40, a portion of the compressed ram air is supplied to onboard avionics 62. If desired, the compressed ram air to be supplied to the cabin and/or flight deck 60 may be mixed with air recirculated from the cabin and/or flight deck so that it has a desired temperature level. Any suitable means known in the art, such as a mixing valve, may be used to mix the compressed ram air with the recirculated cabin and/or flight deck air.

While it is preferred to use engine bleed air and an air turbine 46 to supply power to the aircraft mounted accessory drive 48, engine shaft power could be used instead to supply power to the drive 48.

Figure 3:
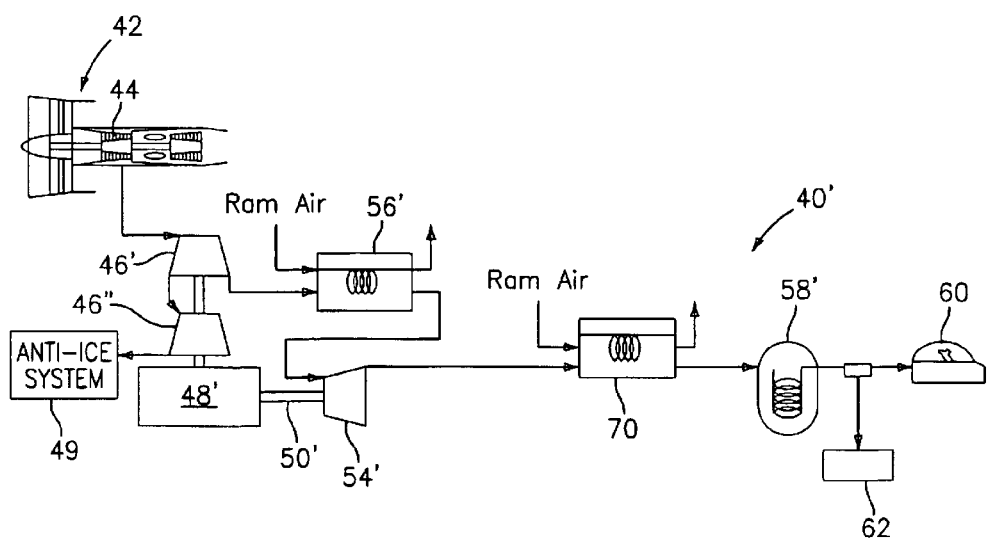
FIG. 3 is a schematic representation of an alternative embodiment of an integrated air turbine driven system for providing aircraft environmental control in accordance with the present invention.

Referring now to FIG. 3, an alternative embodiment of an integrated air turbine driven system 40' for providing aircraft environmental control is illustrated. In the system 40', tandem air turbines 46' and 46" are connected to an aircraft mounted accessory drive 48' to provide shaft power to the drive 48'. Bleed air from the high pressure stage of the compressor 44 in the engine 42 is supplied to the inlet of the air turbine 46'. A portion of the bleed air is also supplied to the inlet of the air turbine 46" from the discharge of air turbine 46'. The bleed air exiting the turbine 46" is supplied to the aircraft's anti-icing system 49. The bleed air exiting the turbine 46' is used as a source of pressurized cabin and/or flight deck air for the aircraft's environmental control subsystem.

The bleed air exiting the turbine 46' is passed through a precooler 56' where its temperature is lowered. Ram air is used as a heat sink in the precooler 56' and is then used for cooling and/or ventilation of aircraft components such as one or more generators and/or other aircraft enclosures.

After passing through the precooler 56', the bleed air is passed through an air turbine 54' where it is further expanded and its temperature is lowered further. The air turbine 54' drives a shaft 50' which supplies or provides additional power to the aircraft mounted accessory device 48'.

After exiting the turbine 54', the bleed air is passed through a heat exchanger 70 where its temperature may be lowered further. Ram air is used as the heat sink for the heat exchanger 70. The ram air exiting the heat exchanger 70 may be dumped overboard or may be used to cool still other aircraft components.

Following cooling in the heat exchanger 70, the bleed air is passed through a water separator 58' where moisture is removed from the bleed air. Thereafter, the conditioned bleed air is ready to be delivered to the cabin and/or flight deck 60. A portion of the bleed air may be diverted to the avionics 62. If needed, the bleed air may be mixed with recirculated cabin and/or flight deck air prior to it being delivered to the cabin and/or flight deck 60. Any suitable means known in the art, such as a mixing valve, may be used to mix the conditioned bleed air and the recirculated flight deck and/or cabin air.

If desired, the heat exchanger 70 may be omitted and air exiting the turbine 54' may be passed directly to the water separator 58'.

In both systems 40 and 40', the water separator 58 and 58' respectively may be eliminated if a condenser/reheater assembly is used.

It is apparent that there has been provided in accordance with the present invention an integrated air turbine driven system for providing aircraft environmental control which fully satisfies the objects, means and advantages set forth hereinbefore. While the present invention has been described in the context of specific embodiments thereof, other alternatives, modifications, and variations will become apparent to those skilled in the art having read the foregoing description. Accordingly, it is intended to embrace such alternatives, modifications and variations as fall within the broad scope of the appended claims.

What is claimed is:

1. An integrated environmental control system for an aircraft comprising:

aircraft mounted accessory drive (AMAD);

at least one turbine connected to said aircraft accessory mounted drive to provide power to said aircraft accessory mounted drive;

means for supplying bleed air from an engine to said at least one turbine; and means for supplying air exiting said at least one turbine to an anti-icing system.

2. The integrated environmental control system according to claim 1, wherein said bleed air supplying means comprises means for supplying bleed air from a high pressure compressor stage of said engine.

3. An integrated environmental control system for an aircraft comprising:

aircraft mounted accessory drive (AMAD);

at least one turbine connected to said aircraft accessory mounted drive to provide power to said aircraft accessory mounted drive;

means for supplying bleed air from an engine to said at least one turbine;

means for supplying air exiting said at least one turbine to an anti-icing system; and means for supplying cooled pressurized ram air to at least one of a cabin and a flight deck of said aircraft.

4. The integrated environmental system of claim 3, further comprising providing a portion of said cooled pressurized air to onboard avionics.

5. The integrated environmental control system of claim 3, wherein said cooled and pressurized ram air supplying means comprises:

a compressor for increasing pressure and temperature of ram air being supplied to said compressor;

an expansion turbine for expanding compressed ram air and for lowering the temperature of said ram air; and said compressor and turbine being mounted to a shaft connected to said aircraft accessory mounted drive.

6. An integrated environmental control system according to claim 5, wherein said cooled and pressurized ram air supplying means further comprises a pre-cooler for receiving pressurized ram air from an exit of said compressor and for delivering cooled pressurized ram air to an inlet of said expansion turbine.

7. An integrated environmental control system according to claim 6, further comprising said pre-cooler using ram air as a heat sink.

8. An integrated environmental control system according to claim 5, wherein said cooled and pressurized ram air supplying means further comprises means for removing moisture from said air exiting said expansion turbine.

9. An integrated environmental control system according to claim 1, further comprising first and second turbines connected to said aircraft accessory mounted drive for providing power to said aircraft accessory mounted drive.

10. An integrated environmental control system according to claim 9, wherein said first turbine receives said bleed air from said engine and supplies said air to means for supplying environmental air to at least one of a flight deck and a cabin and said second turbine receives a portion of said bleed air and supplies air to said anti-icing system.

11. The integrated environmental control system of claim 10, wherein said means for supplying environmental air comprises an expansion turbine mounted to a shaft driving said aircraft accessory mounted drive and a first means for cooling said bleed air exiting said first turbine and for supplying cooled air to said expansion turbine.

12. The integrated environmental control system of claim 11, wherein said first cooling means comprises a precooler using ram air as a heat sink.

13. The integrated environmental control system of claim 11, wherein said means for supplying environmental air further comprises a second means for cooling air exiting said expansion turbine.

14. The integrated environmental control system of claim 13, wherein said second cooling means comprises a precooler using ram air as a heat sink.

15. The integrated environmental control system of claim 13, wherein said means for supplying environmental air further comprises means for removing moisture from said air being supplied to said at least one of a cabin and a flight deck.

16. A method for providing environmental control to an aircraft comprising the steps of:

bleeding air from an aircraft engine;

delivering said bleed air to at least one turbine;

using said at least one turbine to provide power to an aircraft mounted accessory drive; and delivering air from said at least one turbine to an anti-icing system.

17. A method according to claim 16, wherein said bleeding step comprises bleeding air from a high pressure compressor stage of said engine.

18. A method for providing environmental control to an aircraft comprising the steps of:

bleeding air from an aircraft engine;

delivering said bleed air to at least one turbine;

using said at least one turbine to provide power to an aircraft mounted accessory drive;

delivering air from said at least one turbine to an anti-icing system; and supplying cooled pressurized ram air to at least one of a cabin and a flight deck.

19. A method according to claim 18, wherein said cooled pressurized air supplying step comprises providing a compressor and an expansion turbine mounted to a shaft driven by said aircraft accessory mounted drive, compressing ram air using said compressor to elevate the pressure and temperature of said ram air and providing said ram air at said elevated pressure to said expansion turbine.

20. A method according to claim 19, wherein said cooled pressurized air supplying step comprises passing said ram air exiting said compressor through a precooler to lower the temperature of said compressed ram air and delivering said lower temperature, compressed ram air to an inlet of said expansion turbine.

21. A method according to claim 19, wherein said cooled pressurized air supplying step comprises removing moisture from said cooled ram air exiting said expansion turbine.

22. A method according to claim 19, wherein said cooled pressurized air supplying step further comprises providing a portion of said pressurized air to an avionics deck.

23. A method according to claim 16, further comprising providing two turbines mounted to said aircraft accessory mounted drive and said bleed air delivering step comprises delivering said bleed air to a first turbine and delivering a portion of said bleed air to a second turbine and wherein said anti-icing system delivering step comprises delivering air exiting said second turbine to said anti-icing system.

24. A method according to claim 23, further comprising cooling bleed air exiting said first turbine for delivery to at least one of a flight deck and a cabin.

25. A method according to claim 24, wherein said cooling step comprises passing said bleed air exiting said first turbine through a first means for cooling said bleed air and then through an expansion turbine mounted on shaft driven by said aircraft accessory mounted drive.

26. A method according to claim 25, wherein said cooling step further comprises passing cooled bleed air exiting said expansion turbine through a second means for cooling said bleed air and through a means for removing moisture from said cooled bleed air, and means for delivering said cooled bleed air to said at least one of a flight deck and a cabin.

27. A method according to claim 26, further comprising delivering a portion of said cooled bleed air to an avionics deck.

28. An integrated environmental control system for an aircraft comprising:

aircraft mounted accessory drive for driving at least one of a generator, a pump, a lubrication system and an accessory;

at least one turbine connected to said aircraft accessory mounted drive to provide power to said aircraft accessory mounted drive;

means for supplying bleed air from an engine to said at least one turbine; and means for supplying air exiting said at least one turbine to an anti-icing system.

29. A method for providing environmental control to an aircraft comprising the steps of:

bleeding air from an aircraft engine;

delivering said bleed air to at least one turbine;

using said at least one turbine to provide power to an aircraft mounted accessory drive for driving at least one of a generator, a pump and a lubrication system; and delivering air from said at least one turbine to an anti-icing system.

* * * * *